(12) United States Patent
Gaberthüel et al.

(10) Patent No.: US 11,015,964 B2
(45) Date of Patent: May 25, 2021

(54) THERMAL FLOW MEASURING DEVICE AND METHOD FOR ITS MANUFACTURE

(71) Applicant: Endress+Hauser Flowtec AG, Reinach (CH)

(72) Inventors: Stephan Gaberthüel, Oberwil (CH); Axel Pfau, Wehr (DE); Tobias Baur, Reinach (CH)

(73) Assignee: Endress+Hauser Flowtec AG, Reinach (CH)

( * ) Notice: Subject to any disclaimer, the term of this patent is extended or adjusted under 35 U.S.C. 154(b) by 147 days.

(21) Appl. No.: 15/769,808

(22) PCT Filed: Sep. 8, 2016

(86) PCT No.: PCT/EP2016/071210
§ 371 (c)(1),
(2) Date: Apr. 20, 2018

(87) PCT Pub. No.: WO2017/067702
PCT Pub. Date: Apr. 27, 2017

(65) Prior Publication Data
US 2019/0025103 A1    Jan. 24, 2019

(30) Foreign Application Priority Data

Oct. 23, 2015   (DE) .................... 10 2015 118 130.4

(51) Int. Cl.
*G01F 1/684*      (2006.01)
*G01F 15/14*      (2006.01)

(52) U.S. Cl.
CPC ............ *G01F 1/684* (2013.01); *G01F 1/6842* (2013.01); *G01F 15/14* (2013.01)

(58) Field of Classification Search
CPC ........ G01F 1/684; G01F 1/6842; G01F 15/18; G01K 1/08
See application file for complete search history.

(56) References Cited

U.S. PATENT DOCUMENTS 3,366,942 A * 1/1968 Deane ..................... G01F 1/696
                                                                 340/608
4,143,348 A * 3/1979 Hoge ........................ G01K 1/00
                                                                 338/22 SD (Continued)

FOREIGN PATENT DOCUMENTS

| CN | 1529807 A | 9/2004 |
| CN | 102918366 A | 2/2013 |

(Continued)

OTHER PUBLICATIONS

Search Report for German Patent Application No. 10 2015 118 130.4, German Patent Office, dated Apr. 7, 2016, 6 pp.

(Continued)

*Primary Examiner* — Justin N Olamit
(74) *Attorney, Agent, or Firm* — Kelly J. Smith; Endress+Hauser (USA) Holding Inc.

(57) ABSTRACT

A thermal, flow measuring device comprising a sensor with a metal sensor housing, which has a hollow body for connecting to a plug-in apparatus and/or a tube or pipe wall, wherein the hollow body has a base area; wherein the sensor housing has at least first and second pin sleeves, which protrude starting from the base area, wherein the metal sensor housing is embodied as one piece and the pin sleeves and the hollow body are connected together seam freely, especially weld seam freely.

18 Claims, 1 Drawing Sheet

(56) References Cited

U.S. PATENT DOCUMENTS

| | | | |
|---|---|---|---|
| 5,880,365 A * | 3/1999 | Olin | G01F 1/684 |
| | | | 73/204.22 |
| 8,899,830 B2 * | 12/2014 | Pfau | G01F 1/684 |
| | | | 374/163 |
| 2003/0196486 A1 | 10/2003 | Zurek et al. | |
| 2011/0048564 A1 | 3/2011 | Wible et al. | |
| 2015/0192442 A1 | 7/2015 | Olin | |
| 2016/0238456 A1 * | 8/2016 | Wigen | G01K 1/08 |
| 2017/0016096 A1 * | 1/2017 | Wentland | C22C 1/0416 |

FOREIGN PATENT DOCUMENTS

| | | |
|---|---|---|
| DE | 4341239 A1 | 6/1994 |
| DE | 4310720 A1 | 10/1994 |
| DE | 10019991 A1 | 1/2002 |
| DE | 20309694 U1 | 9/2003 |
| DE | 102007042789 A1 | 3/2009 |
| DE | 102008015359 A1 | 9/2009 |
| DE | 102009045956 A1 | 4/2011 |
| DE | 102010018947 A1 | 11/2011 |
| DE | 102011009754 A1 | 8/2012 |
| DE | 102012109237 A1 | 4/2014 |
| JP | 10281836 A | 10/1998 |
| WO | 2015008452 A1 | 6/2015 |

OTHER PUBLICATIONS

Search Report for International Patent Application No. PCT/EP2016/071210, WIPO, dated Nov. 25, 2016, 12 pp.

* cited by examiner

THERMAL FLOW MEASURING DEVICE AND METHOD FOR ITS MANUFACTURE

CROSS-REFERENCE TO RELATED APPLICATIONS

The present application is related to and claims the priority benefit of German Patent Application No. 10 2015 118 130.4, filed on Oct. 23, 2015 and International Patent Application No. PCT/EP2016/071210 filed on Sep. 8, 2016, the entire contents of which are incorporated herein by reference.

TECHNICAL FIELD

The present invention relates to a thermal, flow measuring device as defined in the preamble of claim 1 and to a method for its manufacture.

BACKGROUND

The structural embodiment of thermal, flow measuring devices is known per se. Starting from a, most often cylindrical, hollow body having a base area, there extend at least two cylindrical pin sleeves into the interior of a tube or pipe. These pin sleeves are, however, most often connected by weld seams with the cylindrical hollow body. A typical example is shown and described in DE 10 2010 061 731 A1.

Often connections at joints are created by welding. Depending on joint type, different welded seams can be applied, which have different seam- or joint form and different seam buildup. Welders distinguish between butt welds and fillet welds. In the case of butt welds, the lines of force extend with relatively more uniform stress distribution, while in the case of fillet welds the lines of force are deflected, which leads to stress concentrations.

In the field of thermal, flow measurement, the usual preparation of the joint and following welding have disadvantages, since at the gap, or joint, the heat transfers change in the case of temperature change. This can lead to measurement errors.

SUMMARY

An object of the present invention is, consequently, to prevent the aforementioned problems.

The invention achieves this object by a thermal, flow measuring device as defined in claim 1.

A thermal, flow measuring device of the invention includes a sensor with a metal sensor housing.

The metal sensor housing has a hollow body for connecting to a plug-in apparatus and/or to a tube or pipe wall. A plug-in apparatus can be e.g. a framework, on whose end the aforementioned sensor housing is arranged. This framework is then inserted into the tube through a hole, which is most often arranged, with reference to the gravitational field, at the uppermost point of a tube. The environmentally bounding wall of the sensor housing is, thus, partially or completely exposed to a flow of the measured medium located in the tube or pipe. Alternatively to the plug-in apparatus, the metal sensor housing can also be secured directly or by means of a tubular extension fixedly to a tube wall. The type of emplacement of the sensor housing, or the hollow body, is, however, of only subordinate importance in the context of the present invention.

The aforementioned hollow body includes a base area. This base area can be, for example, flat or rounded.

The sensor housing includes at least two pin sleeves, which, starting from the base area, protrude into the interior of a tube or pipe. The pin sleeves can be embodied e.g. cylindrically or prismatically.

The metal sensor housing of the invention is embodied as one piece and the pin sleeves and the hollow body are connected together seam freely. For a long time, it has been usual practice to assemble the pin sleeves with the hollow body and then to weld them together. These designs create a heat transfer, which changes with temperature change of the medium and, because of production conditions, is not reproducible for each sensor housing. This can lead to a measurement error, which differs from sensor housing to sensor housing.

The terminology, seam free, means in the context of the present invention that neither a weld seam nor an adhesive- or solder or braze seam is present as connection between the pin sleeves and the hollow body.

Advantageous embodiments of the invention are subject matter of the dependent claims.

The metal sensor housing is advantageously embodied as a monolithic component. This means that the sensor housing is manufactured completely of one material. While generative manufacturing methods also enable combinations of a number of metals or metal alloys, e.g. steel and titanium, and these are included in the scope of the present invention, they are not preferred for monolithic embodiments.

Advantageously, each of the pin sleeves has a terminal section with a medium-contacting end face. In a first of the two pin sleeves, especially in the terminal section of such pin sleeve, a heater is arranged, and in a second of the two pin sleeves, especially in the terminal section of such pin sleeve, a temperature sensor is arranged for ascertaining the temperature of the medium. This embodiment describes a typical thermal, flow measuring device having a heater and a temperature sensor, which are mostly thermally decoupled from one another and accommodated in two individual, metal pin sleeves. These are often also referred to as sensor elements. Often applied as heater and as temperature sensor are two heatable resistance thermometers of the same type, e.g. PT100 sensors, of which one resistance thermometer is actively heated and, thus, applied as heater. These sensor elements enable the flow measurement. A flow measuring device embodied in such a manner is known per se and has been commercially sold for many years, however, the, most often cylindrical, pin sleeves with the corresponding heatable resistance thermometers in the previous variants of the state of the art have always been welded with the hollow body. In a preferred variant of the invention, also a number of heatable resistance thermometers can be introduced into a sleeve.

Advantageously, the pin sleeves of the thermal, flow measuring device of the invention has, at least in the terminal section, a wall thickness of less than 0.5 mm, preferably between 0.1-0.4 mm. The very thin wall thickness permits a rapid response of the sensor in the case of change of flow velocity.

A thermal, flow measuring device has always a certain sensitivity to the ambient temperature. Also, an optimal as possible heat distribution along the metal walls of the pin sleeves, e.g. of the heat radiated by the heater, is preferable. In this context, the wall thickness advantageously varies, at least in the region of the terminal section, by less than 20%, preferably by less than 10%.

A good response coupled simultaneously with good thermal decoupling between heater and temperature sensor can be achieved, when the two aforementioned pin sleeves are embodied especially thin and long. Advantageously, the terminal section of the pin sleeves has a cylindrical lateral surface with a diameter d1 and the terminal section extends over a length l2, characterized in that the ratio l2/d1 is greater than or equal to 5, preferably greater than or equal to 7. Such pin sleeves, which are additionally integrated as one piece and seam freely into a sensor housing, have not been known to this point in time.

For stability under pressure and chemical stability, the sensor housing is advantageously composed of steel and/or titanium and/or Hastelloy.

The sensor housing can preferably have at least three pin sleeves, thus the first, the second and preferably a third pin sleeve, which preferably extend parallel to one another. Two of the pin sleeves can, such as above described, be equipped with a heater and a temperature sensor for ascertaining the temperature of the medium. They enable the flow measurement, in manner known per se. The third sensor sleeve can likewise have a heater, preferably embodied analogously to the heaters of the other two pin sleeves. For example, in the case of non-uniform soiling or corrosion of the pin sleeves, the ascertaining and/or compensation of a sensor drift is advantageously enabled. This additional pin sleeve can, in such case, likewise be advantageously one piece and connected seamlessly with the hollow body.

Advantageously, the sensor housing has a flow obstruction, which is arranged in such a manner relative to one of the three aforementioned pin sleeves that one of the pin sleeves, starting from when the sensor housing is flowed on from a predetermined flow direction, lies partially or completely in the flow shadow of the flow obstruction, while the other two pin sleeves are arranged removed from the flow shadow. Preferably, a heater is arranged in the third pin sleeve. This permits a direction detection as a function of whether the flow of the measured medium from the aforementioned flow direction and thereby the flowing on and the transport of the heat away from the heater is hindered by the flow obstruction, or whether the flow direction of the measured medium is opposite to such flow direction. In latter case, the third pin sleeve is not in the flow shadow of the flow obstruction.

The flow obstruction can preferably be embodied as a prism shaped pin sleeve, e.g. with a triangular cross section, which extends especially preferably parallel to the other three pin sleeves.

The third pin sleeve and/or pin-shaped element can, starting from the base area of the hollow body, protrude into the interior of the tube or pipe and be connected seam freely with the hollow body, wherein the length of the third pin sleeve and/or the flow obstruction is preferably less than the length of the first two pin sleeves. In this way, the heater in the third sensor element does not influence the flow measurement, since it is arranged on another plane perpendicular to the longitudinal axis of the sensor housing than the heater and the temperature sensor of the first two pin sleeves.

The sensor housing includes preferably an arch, which bridges over at least the first and second pin sleeves and which preferably is connected with the hollow body. Such arch serves for flow guidance. The arrangement of the at least two pin sleeves can form a connecting axis, which lies in a symmetry plane. The arch lies preferably likewise on this symmetry plane and is embodied symmetrically to such symmetry plane.

In a preferred embodiment, the arch is connected seam freely with the hollow body.

The length of the terminal section amounts advantageously to at least 2 mm, preferably 3-10 mm, and the total length of a pin sleeve amounts preferably to at least 10 mm. Correspondingly long pin sleeves enable an especially good thermal decoupling.

The sensor housing of the flow measuring device of the invention can be produced by means of a generative manufacturing method, preferably by means of a radiation melt method. While corresponding sensor housings are also implementable via other manufacturing methods, thus e.g. by primary forming methods, especially by metal injection molding, it has been found that especially good manufacturing tolerances and especially thin walled components are achievable with the aforementioned, preferred manufacturing method.

BRIEF DESCRIPTION OF THE DRAWING

The invention will now be explained in greater detail based on an example of an embodiment and with the help of the appended drawing. This description and the figures are by way of example and are not intended to limit the scope of protection of the present invention. The figures of the drawing show as follows.

DETAILED DESCRIPTION

Figure 1:
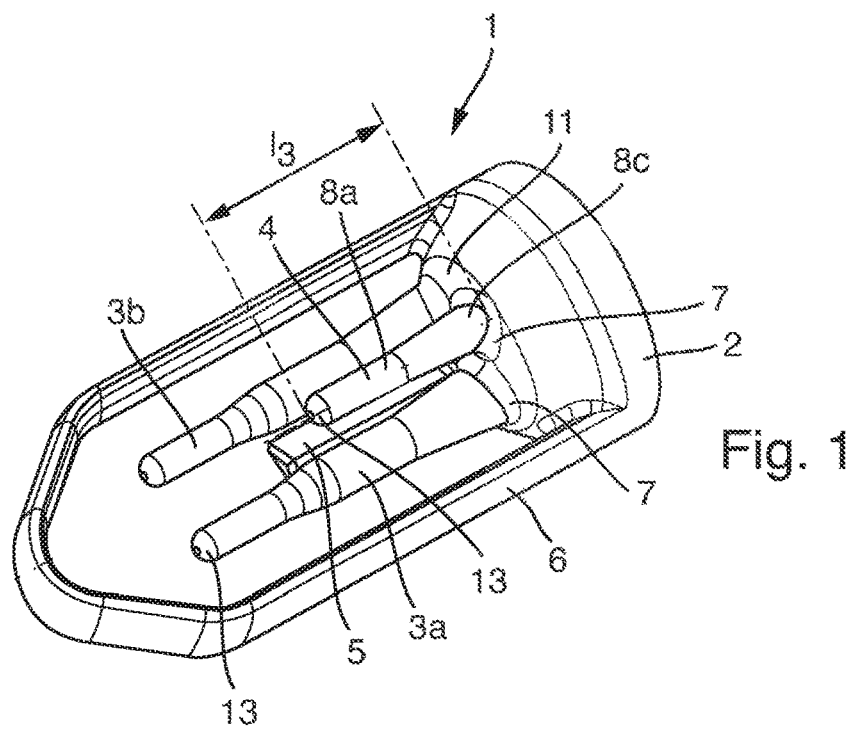
FIG. 1 shows a perspective view of a sensor housing of a thermal, flow sensor of the invention.

Conventional, thermal, flow measuring devices use usually two, as equally embodied as possible, heatable resistance thermometers, which are arranged in, most often, pin-shaped metal sleeves, so-called stingers, or in cylindrical metal sleeves and which are in thermal contact with the medium flowing through a measuring tube or through the pipeline. For industrial application, the two resistance thermometers are usually installed in a measuring tube; the resistance thermometers can, however, also be directly mounted in the pipeline. One of the two resistance thermometers is a so-called active sensor element, which is heated by means of a heating unit. Provided as heating unit is either an additional resistance heater, or the resistance thermometer is a resistance element, e.g. an RTD (Resistance Temperature Device) sensor, which is heated by conversion of electrical power, e.g. by a corresponding variation of the measuring electrical current. In the field of thermal flow measurement, the active sensor element is also often called the heater. The second resistance thermometer is a so-called passive sensor element: It measures the temperature of the medium.

Usually, in a thermal, flow measuring device, a heatable resistance thermometer is so heated that a fixed temperature difference is established between the two resistance thermometers. Alternatively, it is also known to supply a constant heating power via a control unit.

If there is no flow in the measuring tube, then an amount of heat constant with time is required for maintaining the specified temperature difference. If, in contrast, the medium to be measured is moving, the cooling of the heated resistance thermometer depends essentially on the mass flow of the medium flowing past it. Since the medium is colder than the heated resistance thermometer, heat is transported away from the heated resistance thermometer by the flowing medium. In order thus in the case of a flowing medium to maintain the fixed temperature difference between the two resistance thermometers, an increased heating power is required for the heated resistance thermometer. The increased heating power is a measure for the mass flow of the medium through the pipeline. The heating power can be described by a so-called power coefficient PC.

If, in contrast, a constant heating power is supplied, then, as a result of the flow of the medium, the temperature difference between the two resistance thermometers lessens. The particular temperature difference is then a measure for the mass flow of the medium through the pipeline, or through the measuring tube, as the case may be.

There is, thus, a functional relationship between the heating energy needed for heating the resistance thermometer and the mass flow through a pipeline, or through a measuring tube, as the case may be. The dependence of the heat transfer coefficient on the mass flow of the medium through the measuring tube, or through the pipeline, is utilized in thermal, flow measuring devices for determining the mass flow. Devices, which operate on this principle, are produced and sold by the applicant under the marks, 't-switch', 't-trend' and 't-mass'.

Figure 2:
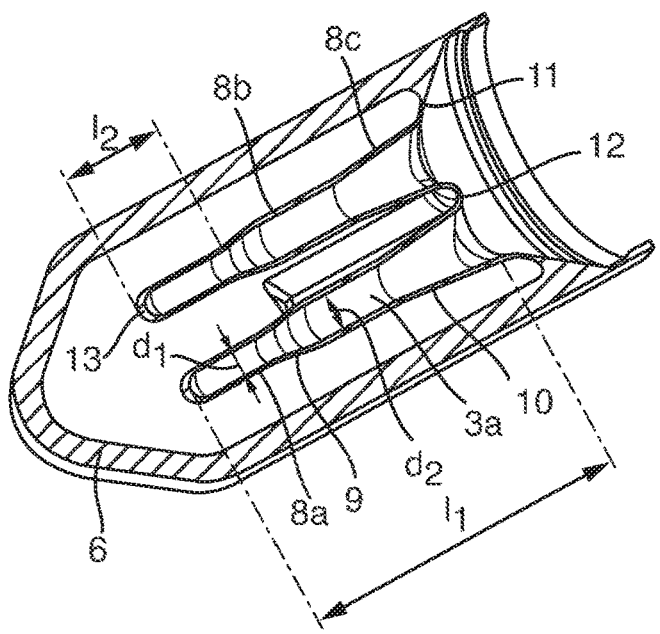
FIG. 2 shows a sectional view of the sensor housing of FIG. 1.
Figure 2A:
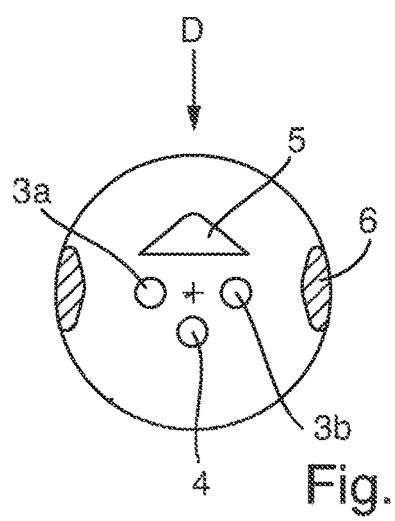
FIG. 2a shows a sectioned plan view of FIG. 1.

Shown in greater detail in FIGS. 1, 2 and 2a is a special variant of a thermal, flow measuring device. In such case, one sees especially the housing of a measuring transducer of a thermal, flow measuring device, which is hereinafter referred to as the sensor housing 1. This housing is of metal and can be embodied as a plug-in sensor or be affixed durably, in given cases, with an intermediate piece, to the inner surface of a measuring tube.

In addition to the measuring transducer, the thermal, flow measuring device includes, of course, also an evaluation unit, which, however, is not shown, for reasons of perspicuity.

The sensor housing 1 of a measuring transducer to be described here represents only an especially preferred embodiment of the invention and is not intended to limit the scope of protection of the present invention.

The sensor housing 1 includes a hollow body 2, which can be affixed directly or by an intermediate piece to a mount of a plug-in apparatus, e.g. a plug-in rod, or to a measuring tube or to a pipe, as the case may be.

The hollow body 2 includes a plate-shaped base area 11, starting from which at least two, a first and a second, pin sleeves 3a and 3b extend into the lumen, thus into the interior, of a tube, for example, of the measuring tube.

The hollow body 2 in the embodiments of FIGS. 1 and 2 is frustoconically shaped. It can, however, also have another shape, e.g. be cylindrical or have the shape of a truncated pyramid.

There are in FIGS. 1, 2 and 2a a total of four pin sleeves. This variant is preferable, since, with this housing form, a number of functionalities, e.g. drift detection and direction detection, can be united advantageously and constructively in a thermal, flow measuring device.

At the same time, the embodiment of FIGS. 1 and 2 shows that in the context of the present invention also more complicated sensor housing variants can be implemented.

The present invention can have in a simplified embodiment also only the two pin sleeves 3a and 3b. The pin sleeves are connected with the hollow body as one piece and connection seam freely, especially in the connection region 12. The terminology, connection seam, means in the sense of the present invention a weld seam, an adhesive seam, a solder seam, a braze seam or the like. Especially preferably, the housing, thus the totality of pin sleeves and hollow body, is monolithically embodied.

The first and second pin sleeves 3a, 3b have, in each case, a medium contacting, end face 13. This is rounded in FIGS. 1 and 2, but it can also be flat.

The pin sleeves 3a and 3b can, in each case, be embodied stepped, whereby a better introduction and positioning of a heating element and/or a temperature sensor in the pin sleeves through their terminal opening on the side of the pin sleeves facing away from the medium can occur.

The geometric embodiment of a pin sleeve 3a or 3b is such that, starting from the end face 13, firstly, there follows a first section 8a with cylindrical pin sleeve wall and a first constant cylinder diameter d1. Then, there follows a second section 8b with a cylindrical pin sleeve wall and a second constant cylinder diameter d2.

Alternatively, also the first and/or second section can have a conical shape. In this case, the diameters d1 and/or d2 have average values. The transitional region between the first and second sections 8a and 8b is not abrupt, but, instead exhibits a continual increase of the diameter from the first diameter d1 to a second diameter d2. There is in the case of a corresponding stepping 9, consequently, not an abrupt, but, instead, a gradual changing of the diameter. Then, the pin sleeves enter a transitional region 10 in a third section 8c, which is embodied frustoconically and in the case of which the diameter d grows gradually in the course of the frustum to a transitional region 7 at the hollow body 2. The pin sleeves 3a and 3b have a length l1 of at least 10 mm.

Associated with the section 8a according to the definition of the present invention is the end face 13. Arranged in this section 8a of a first of the two pin sleeves 3a and 3b is a heating element, or heater (not shown). This can be e.g. also a heatable resistance thermometer. The heating element does not absolutely have to contact the end face or cylinder lateral surface of the pin sleeves, but can, instead, preferably be thermally coupled with the wall of the pin sleeves via a copper bridge. The same holds also for the additional, optional pin sleeves. A corresponding arrangement and its advantages are described in detail in DE 10 2008 015 359 A1.

Arranged in the section 8a of a second of the two pin sleeves 3a and 3b is a temperature sensor for ascertaining the temperature of the medium. This can likewise be embodied as a heatable resistance thermometer, wherein during operation of the thermal, flow measuring device, preferably, in each case, one of the resistance thermometers can be actively heated and one of the resistance thermometers can be operated unheated.

The wall thickness of the pin sleeves 3a and 3b at least in the section 8a amounts to less than 0.5 mm, preferably less than or equal to 0.4 mm, especially 0.1 to 0.4 mm. Due to the thin wall thickness, an especially more favorable heat transfer can be achieved.

The length l2 of this section 8a can be at least 2 mm, preferably, however, 3-10 mm.

The ratio of the length l2 to the diameter d1 for the first section 8a is preferably greater than 5, especially preferably equal to or greater than 7.

In a preferred embodiment of the invention, the average ratio $d_{average\ value}/l1$ for the entire pin sleeve amounts preferably to greater than 4, wherein the diameter is always for the particular length of the section of the pin sleeve, in which the diameter is actually present. In the case of a frustum, such as in section 8c, an averaging of the diameter can occur.

The housing 2 is manufactured of metal. As especially preferred metal, steel can be utilized. Alternatively, e.g. for strongly corrosive media, also titanium can be utilized as wall material.

Additionally, the housing can be provided with a metal outer coating, in order, in given cases, to increase the resistance to certain media. The outer coating of the present invention is not, however, part of the housing 2, but, instead, a coating of material applied supplementally on the housing.

Different from the above-described basic form for an thermal, flow measuring device of the invention, the embodiment shown in FIGS. 1 and 2 includes an optional flow obstruction 5 (which can be embodied as a pin sleeve or as a solid element) as well as a likewise optional, third pin sleeve 4.

The flow obstruction 5 has, compared with the first two pin sleeves 3a and 3b, another geometric cross sectional shape, at least in an end region with an end face. Especially, the end region with the end face is embodied prismatically. In the embodiments of FIGS. 1 and 2, the cross sectional shape is embodied as a triangle. The flow obstruction 5 is arranged in front of the third pin sleeve 4 in the illustrated, first flow direction D.

The first and second sensor sleeves form a shared connecting axis. The first flow direction D is defined in such a manner that it is arranged at an angle of 80-100° to the connecting axis, on a plane, which is perpendicular to the longitudinal axes of the two aforementioned sensor sleeves and on which the connecting axis lies. The measured medium strikes in the first flow direction, firstly, on the flow obstruction 5. The third sensor element 4 lies partially or completely in the flow shadow of this flow obstruction 5.

Depending on positioning of the sensor in the flow of medium, there can be, instead of the first flow direction D, also a second flow direction (not shown), which is opposite to the first flow direction D. In this flow direction, the third pin sleeve is directly flowed against.

The so arranged, third pin sleeve 4, which likewise has a heater, can be utilized for direction detection.

The general method for flow direction detection is described in the documents, DE 10 2009 045 956 A1 and DE 10 2010 040 285 A1, to which comprehensive reference is taken in the context of the present invention.

There occurs, in such case, the ascertaining of a decision coefficient DC based on two power coefficients, power coefficients PC1 and PC2. In the present case, this concerns a power coefficient PC1 of the heater in one of the pin sleeves 3a or 3b and a second power coefficient of the heater in the third pin sleeve 4. The decision coefficient is ascertained as follows $DC=(PC2-PC1)/PC2$. By reconciliation of the decision coefficient with a limit value, it can then be decided, from which direction the flow D is flowing through a pipe, or measuring tube, as the case may be. Significantly, the power coefficient of the heater of the third pin sleeve changes, depending on whether the pin sleeve is in the flow shadow of the flow obstruction 5 or whether it is directly flowed on.

As one can see from FIGS. 1 and 2, the third pin sleeve 4 has a lesser total length l3 compared with the total length of the first or second sleeve 3a and 3b. Sleeve 4 has, analogously to the pin sleeves 3a, 3b, an end face 13, which is associated with a first cylindrical section 8a of the pin sleeve 4. Following this first section is a third section 8c, which is embodied conically analogously to the sleeves 3a and 3b. A second cylindrical section 8b is missing in the case of pin sleeve 4. Arranged in this shorter, third pin sleeve 4 is likewise a heater, e.g. a heatable resistance thermometer.

Additionally, the flow obstruction 5 also has a lesser total length l3 compared with the total length l1 of the first or second pin sleeve 3a and 3b. Due to the different planes perpendicular to the longitudinal axes of the pin sleeves, on which the heaters are arranged, the flow measurement is not influenced by the direction detection.

The shorter, third pin sleeve 4 also has another degree of soiling. By ratio formation of e.g. the power coefficient of the heater in the first or second pin sleeve 3a, 3b to that of the heater in the third pin sleeve 4, an estimate of the sensor drift over the operating time of the thermal, flow measuring device can be made. In given cases, a quantifying of the sensor drift can occur and especially preferably a compensating of the sensor drift in the case of the flow measurement.

If the flow obstruction 5 is a sensor sleeve, then also a heater, or heating element, preferably a heatable resistance thermometer, can be provided in this sensor sleeve. Just due to the different geometric shape, another soiling behavior of such pin sleeve is to be expected and therewith another sensor drift in the course of the duration of operation of the thermal, flow measuring device. For example, by difference forming of the power coefficients of the different heating elements, it can be compared, by what percent the differences change during measurement operation, so that a sensor drift is still reliably detectable and compensatable.

Optionally, the housing 1 can have an arch 6, which curves over the arrangement of the first and second pin sleeves 3a, 3b, the optional third pin sleeve 4 and the pin-shaped element 5 and is connected with the hollow body 2 preferably likewise monolithically and seam freely. This arch serves preferably as a flow guiding element.

A monolithic sensor housing with at least two elongated, thin walled pin sleeves is additionally a manufacturing challenge. By means of precision casting, corresponding structures are manufacturable in cost- and time-consuming manner. The used metal materials must additionally also be suitable for casting. For a successful precision casting, many aspects, such as the cooling speed and, in given cases, reworking steps for surface preparation, must be controlled. Similar disadvantages also occur in the case of primary forming methods, e.g. the so-called metal injection molding (MIM), which basically can be utilized in the context of the invention for manufacture of the sensor housing. A special advantage of the MIM method is a comparatively high manufacturing speed.

Especially preferable are generative manufacturing methods, such as radiation melt methods, such as e.g. selective laser melting, which is also known as the SLM method, in order to manufacture such an object with appropriately thin wall thickness and corresponding length of the pin sleeves.

In the case of an SLM method, metal powder is applied in a thin layer on a surface. The metal powder is then locally completely melted by laser radiation and solidified to a fixed material layer in a coating thickness of typically 15-150 µm. Then, the surface is lowered by the magnitude of the coating thickness and a new material layer applied. In this way, the housing 1 of the measuring transducer is gradually formed. Material stresses and corrosion susceptible seams are not present in such case.

The invention claimed is:

1. A thermal, flow measuring device comprising:
a sensor with a metal sensor housing including a hollow body having a base area and adapted to connect to a plug-in apparatus and/or to a tube or pipe wall, wherein the sensor housing is embodied as one piece with a first pin sleeve and a second pin sleeve, which each extend from the base area, and wherein the first pin sleeve, the second pin sleeve and the hollow body are connected without seams therebetween, are formed together as one solid piece, and have no joints;
a third pin sleeve extending from the base area parallel to the first pin sleeve and/or the second pin sleeve
a flow obstruction disposed relative to the third pin sleeve such that the third pin sleeve lies partially or completely in a flow shadow of the flow obstruction in a predetermined flow direction, wherein the first pin sleeve and second pin sleeve are not arranged within the flow shadow of the flow obstruction;
wherein the third pin sleeve and/or the flow obstruction, starting from the base area of the hollow body, extend into an interior of the tube or pipe and are connected seamlessly with the hollow body, and wherein a total length of the third pin sleeve and/or flow obstruction is less than a total length of the first pin sleeve or second pin sleeve.

2. The thermal, flow measuring device of claim 1, wherein the first pin sleeve, the second pin sleeve and the hollow body are connected without weld seams therebetween.

3. The thermal, flow measuring device of claim 1, wherein the sensor housing is embodied as a monolithic component.

4. The thermal, flow measuring device of claim 1, wherein the first pin sleeve and the second pin sleeve each has a terminal section with a medium-contacting end face, wherein a heater is disposed in the terminal section of the first pin sleeve, and wherein a temperature sensor is disposed in the terminal section of the second pin sleeve, the temperature sensor adapted for ascertaining the temperature of a medium.

5. The thermal, flow measuring device of claim 1, wherein the first pin sleeve and the second pin sleeve each has a wall thickness, at least in each terminal section, of less than 0.5 mm.

6. The thermal, flow measuring device of claim 1, wherein the first pin sleeve and the second pin sleeve each has a wall thickness, at least in each terminal section, of between 0.1 and 0.4 mm.

7. The thermal, flow measuring device of claim 5, wherein each wall thickness varies, at least in a region of each terminal section, by less than 20%.

8. The thermal, flow measuring device of claim 5, wherein each wall thickness varies, at least in a region of each terminal section, by less than 10%.

9. The thermal, flow measuring device of claim 1, wherein the first pin sleeve and the second pin sleeve each has a terminal section extending over a length and having a lateral surface, either cylindrical and/or a conical, with a diameter, wherein a ratio of the length to the diameter is greater than or equal to 5, and wherein the diameter corresponds to an average value when the lateral surface is conical.

10. The thermal, flow measuring device of claim 9, wherein the ratio of the length to the diameter is greater than or equal to 7.

11. The thermal, flow measuring device of claim 1, wherein the sensor housing is steel and/or titanium and/or Hastelloy.

12. The thermal, flow measuring device of claim 1, further comprising:
an arch that bridges over at least the first pin sleeve and the second pin sleeve and connects with the hollow body.

13. The thermal, flow measuring device of claim 12, wherein the arch is connected seamlessly with the hollow body.

14. The thermal, flow measuring device of claim 9, wherein the length of each terminal section is at least 2 mm.

15. The thermal, flow measuring device of claim 12, wherein the length of each terminal section is between 3 and 10 mm.

16. The thermal, flow measuring device of claim 1, wherein a total length of the first pin sleeve and/or second pin sleeve is at least 10 mm.

17. A method of manufacturing a thermal, flow measuring device, the method comprising:
producing a sensor housing using a generative manufacturing method or a primary forming method,
wherein the sensor housing includes a hollow body having a base area and adapted to connect to a plug-in apparatus and/or to a tube or pipe wall,
wherein the sensor housing is embodied as one piece with a first pin sleeve and a second pin sleeve, which each extend from the base area, and
wherein the first pin sleeve, the second pin sleeve and the hollow body are connected without seams therebetween, are formed together as one solid piece, and have no joints;
a third pin sleeve extending from the base area parallel to the first pin sleeve and/or the second pin sleeve;
a flow obstruction disposed relative to the third pin sleeve such that the third pin sleeve lies partially or completely in a flow shadow of the flow obstruction in a predetermined flow direction,
wherein the first pin sleeve and second pin sleeve are not arranged within the flow shadow of the flow obstruction;
wherein the third pin sleeve and/or the flow obstruction, starting from the base area of the hollow body, extend into an interior of the tube or pipe and are connected seamlessly with the hollow body, and
wherein a total length of the third pin sleeve and/or flow obstruction is less than a total length of the first pin sleeve or second pin sleeve.

18. The method of claim 17, wherein the generative manufacturing method is a radiation melt method and the primary forming method is a metal injection molding method.

* * * * *